US011481698B2

(12) United States Patent
Xue et al.

(10) Patent No.: US 11,481,698 B2
(45) Date of Patent: Oct. 25, 2022

(54) DATA-DRIVEN METHOD AND APPARATUS FOR HANDLING USER INQUIRIES USING COLLECTED DATA

(71) Applicant: ALIBABA GROUP HOLDING LIMITED, Grand Cayman (KY)

(72) Inventors: Shaofei Xue, Hangzhou (CN); Jiaxing Zhang, Hangzhou (CN); Hengbin Cui, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 1112 days.

(21) Appl. No.: 16/029,508

(22) Filed: Jul. 6, 2018

(65) Prior Publication Data

US 2018/0314990 A1    Nov. 1, 2018

Related U.S. Application Data

(63) Continuation of application No. PCT/CN2016/112853, filed on Dec. 29, 2016.

(30) Foreign Application Priority Data

Jan. 8, 2016  (CN) .......................... 201610014971.0

(51) Int. Cl.
*G06Q 30/00* (2012.01)
*G06Q 10/04* (2012.01)
(Continued)

(52) U.S. Cl.
CPC ............... *G06Q 10/04* (2013.01); *G06K 9/62* (2013.01); *G06N 5/04* (2013.01); *G06N 20/00* (2019.01); *G06Q 30/016* (2013.01)

(58) Field of Classification Search
None
See application file for complete search history.

(56) References Cited

U.S. PATENT DOCUMENTS 8,140,328 B2   3/2012   Williams
8,228,169 B2   7/2012   Ikeda
(Continued)

FOREIGN PATENT DOCUMENTS

CN   102096717 A   6/2011
CN   103390194 A   11/2013
(Continued)

OTHER PUBLICATIONS

IP.com NPL Search Strategy (Year: 2022).*
(Continued)

*Primary Examiner* — Matthew T Sittner
(74) *Attorney, Agent, or Firm* — Finnegan, Henderson, Farabow, Garrett & Dunner, LLP (57) ABSTRACT

The present disclosure provides data-driven methods and apparatuses for predicting user inquiries. One exemplary method includes: collecting user behavior data and pre-processing the user behavior data when a user inquiry is received; extracting candidate user behavior data that is contributive to the user inquiry from the pre-processed user behavior data; screening the candidate user behavior data based on a set target behavior data set, and selecting candidate user behavior data that is contained in the target behavior data set; inputting the screened candidate user behavior data into a trained classifier model; and predicting an inquiry category to which the user inquiry belongs. One exemplary apparatus includes a pre-processing module, an extraction module, and a prediction module. The method and the apparatus embodiments of the present disclosure can improve the efficiency and accuracy of the prediction.

17 Claims, 3 Drawing Sheets

(51) Int. Cl.
*G06N 20/00* (2019.01)
*G06K 9/62* (2022.01)
*G06N 5/04* (2006.01)

(56) References Cited

U.S. PATENT DOCUMENTS

| | | | | |
|---|---|---|---|---|
| 2009/0019171 A1* | 1/2009 | Liu | ..................... | H04L 51/212 |
| | | | | 709/229 |
| 2009/0132347 A1* | 5/2009 | Anderson | ............... | G06Q 30/02 |
| | | | | 705/30 |
| 2012/0143924 A1* | 6/2012 | Sethi | ..................... | G06F 16/248 |
| | | | | 707/E17.014 |
| 2012/0158519 A1* | 6/2012 | Edwards | ............. | G06Q 30/0272 |
| | | | | 705/14.68 |
| 2013/0073387 A1* | 3/2013 | Heath | .................... | G06Q 30/02 |
| | | | | 705/14.53 |
| 2013/0080422 A1* | 3/2013 | Pan | ..................... | G06F 16/1734 |
| | | | | 707/769 |
| 2013/0246456 A1* | 9/2013 | Sun | ..................... | G06F 16/907 |
| | | | | 707/769 |
| 2014/0335490 A1* | 11/2014 | Baarman | ............... | A61B 5/1118 |
| | | | | 434/236 |
| 2015/0106284 A1* | 4/2015 | Rubinstein | ......... | G06Q 30/0201 |
| | | | | 705/319 |
| 2015/0294078 A1* | 10/2015 | Geleijnse | ............... | G16H 10/60 |
| | | | | 705/3 |
| 2016/0063376 A1* | 3/2016 | Chen | ...................... | G06N 5/022 |
| | | | | 706/46 |
| 2016/0239738 A1* | 8/2016 | Feng | ................. | G06F 16/24578 |
| 2016/0364757 A1* | 12/2016 | Zhang | ................ | G06Q 30/0269 |
| 2018/0039899 A1* | 2/2018 | Biemueller | .............. | G06N 5/04 |

FOREIGN PATENT DOCUMENTS

| | | |
|---|---|---|
| CN | 104572734 A | 4/2015 |
| CN | 104778176 A | 7/2015 |
| CN | 104951433 A | 9/2015 |
| KR | 20080104212 A | 12/2008 |
| WO | WO 2017/118333 A1 | 7/2017 |

OTHER PUBLICATIONS

PCT International Search Report and Written Opinion dated Apr. 11, 2017, issued in corresponding International Application No. PCT/CN2016/112853 (13 pgs.).
Extended European Search Report pursuant to Rule 62 EPC, the Supplementary European Search Report (Art. 153(7) EPC) and the European Search Opinion issued in EPO Application No. 16883458.8 dated Dec. 20, 2018 (7 pages).
Manning et al., "An Introduction to Information Retrieval," Retrieved from the Internet URL: Https://nlp.stanford.edu/IR-book/pdf/irbookprint.pdf pp. 1-544 (2009).
Supplemental Search Report issued in corresponding Chinese Application No. 201610014971.0 dated Dec. 16, 2020 (1 page).

* cited by examiner

FIG. 3

DATA-DRIVEN METHOD AND APPARATUS FOR HANDLING USER INQUIRIES USING COLLECTED DATA

This application claims priority to International Application No. PCT/CN2016/112853, filed on Dec. 29, 2016, which claims priority to and the benefits of priority to Chinese Application No. 201610014971.0, filed on Jan. 8, 2016, both of which are incorporated herein by reference in their entireties.

TECHNICAL FIELD

The present disclosure generally relates to the field of data processing technologies, and in particular, to data-driven methods and apparatus for predicting a user inquiry using collected data.

BACKGROUND

Users often encounter problems when using certain products or services. They may turn to customer service for help. Usually, the customer service staff needs to have multiple rounds of conversation with a user to determine the problem the user has encountered, entailing high costs of human resources. If a problem that a user encounters and the corresponding user inquiry can be predicted in advance, a relevant answer can be pushed intelligently. Alternatively, it can assist customer service staff in determining the user's problem more effectively.

Predicting user inquiries presents a typical multi-classification situation, which involves feature selection and modeling. In an existing method, when a feature selection terminal extracts features, it often operates under manually set rules. These rules may be empirically considered to be associated with a problem that a user encounters, such as rules regarding whether the user has subscribed to a certain service, whether the user had a recent transaction in the last couple days, or the like. By matching with the pre-set rules, features that describe the status of the user before engaging in inquiry can be obtained. The extracted features can be modeled by using logistic regression, to obtain a classifier. The classifier can then be used for prediction.

In the existing technologies using manually set rules, the rules are considered to be associated with a problem that a user may have encountered. Features that relate to the status of the user before engaging in inquiry can be obtained. This approach has the following problems. It is not data-driven. Instead, it requires substantial human intervention, and the operation relies on an intervener that fully understands a corresponding product or service. Problems may occur if the products frequently change or the service coverage expands. Further, the existing approach does not take into account the relationship between user behavior within a short time period before seeking help from the customer service staff and the user inquiry itself. The user generally may engage in a series of behaviors within a short time period (for example, within 2 hours) before turning to the customer service staff for help. Such behaviors can include, but are not limited to, clicking a mobile phone or a tablet terminal, browsing the internet and other operations performed by the user. These include the user's behavior trajectory information prior to engaging in inquiry. Theoretically, the behavior trajectories can be strongly associated with the type of assistance that the user seeks subsequently.

SUMMARY

The present disclosure provides data-driven methods and apparatuses for predicting user inquiries. One objective of the present disclosure is to predict a user inquiry regarding a problem that the user encounters as accurately as possible, before the user describes the problem. The prediction can be provided based on known user information and operations. That way, it can avoid influence of human intervention as in the existing techniques and improve accuracy of the prediction.

According to some embodiments of the present disclosure, data-driven methods for predicting user inquiries are provided. One exemplary method includes: collecting user behavior data and pre-processing the user behavior data when a user inquiry is received; extracting candidate user behavior data that is contributive to the user inquiry from the pre-processed user behavior data; screening the candidate user behavior data based on a set target behavior data set, and selecting candidate user behavior data that is contained in the target behavior data set from the candidate user behavior data; inputting the selected candidate user behavior data into a trained classifier model; and predicting an inquiry category to which the user inquiry belongs.

According to some embodiments, an exemplary training process of the trained classifier model includes: collecting user feedback problems and corresponding user behavior data, and pre-processing the collected user behavior data; extracting user behavior data that is contributive to the user feedback problems from the pre-processed user behavior data as candidate user behavior data; scoring the candidate user behavior data, by using a data-driven method according to the user feedback problems and the candidate user behavior data; selecting target behavior data based on a set condition; combining the target behavior data corresponding to the user feedback problems to obtain a target behavior data set; and obtaining a classifier model by training according to the user feedback problems and the target behavior data set.

According to some embodiments, the pre-processing can include the following procedures: removing interference user behavior data whose frequency is lower than a set, frequency threshold.

According to some embodiments, the pre-processing can further include: digitally identifying the user behavior data. Digitally identifying the behavior data can help perform processing with the digital identifiers directly in the subsequent steps. With digitalized identified data, processing does not have to be based on specific data of behavior data, for example, a URL, an API name or other long string data. The processing can therefore be simplified.

According to some embodiments, the candidate user behavior data that is contributive to the user inquiry can be extracted from the pre-processed user behavior data by using windowing and truncation. The windowing and truncation process can include: extracting user behavior data in a recent period of time prior to the user inquiry.

According to some embodiments, after combining target behavior data corresponding to the user feedback problems to obtain a target behavior data set, the method can further include: digitally identifying the target behavior data in the target behavior data set.

According to some embodiments, before obtaining a classifier model by training, the method can further include: performing vectorization processing on the target behavior data in the target behavior data set.

According to some embodiments, before inputting the selected candidate user behavior data into a trained classifier model, the method can further include: performing vectorization processing on the selected candidate user behavior data. Vectorization can facilitate the subsequent processing.

For example, after vectorization, the user behavior data can be used directly to train a classifier model and to perform prediction, and the calculation can be easier.

According to some embodiments of the present disclosure, data-driven apparatuses for predicting user inquiries are provided. One exemplary apparatus comprises: a pre-processing module configured to collect user behavior data and pre-process the user behavior data when a user inquiry is received; an extraction module configured to extract candidate user behavior data that is contributive to the user inquiry from the pre-processed user behavior data; and a prediction module configured to screen the candidate user behavior data based on a set target behavior data set, select candidate user behavior data that is contained in the target behavior data set from the candidate user behavior data, input the selected candidate user behavior data into a trained classifier model, and predict an inquiry category to which the user inquiry belongs.

According to some embodiments, the apparatus can further include a model training module configured to train a classifier model. When training the classifier model, the model training module can be configured to perform the following operations: collecting the user feedback problems and corresponding user behavior data, and pre-processing the collected user behavior data; extracting user behavior data that is contributive to the user feedback problems from the pre-processed user behavior data as candidate user behavior data; scoring the candidate user behavior data, by using a data-driven method according to the user feedback problems and the candidate user behavior data; selecting target behavior data based on a set condition; combining target behavior data corresponding to the user feedback problems to obtain a target behavior data set; and obtaining a classifier model by training according to the user feedback problems and the target behavior data set.

According to some embodiments, when pre-processing the collected user behavior data, the pre-processing module can be configured to perform the following procedures: removing interference user behavior data whose frequency is lower than a set frequency threshold.

According to some embodiments, the pre-processing module can be further configured to digitally identify the user behavior data.

According to some embodiments, the extraction module uses a method of windowing and truncation when extracting candidate user behavior data that is contributive to the user inquiry from the pre-processed user behavior data. The windowing and truncation process can include: extracting user behavior data in a recent period of time prior to the occurrence of the user inquiry.

According to some embodiments, after combining target behavior data corresponding to the user feedback problems to obtain a target behavior data set, the model training module can be further configured to digitally identify the target behavior data in the target behavior data set.

According to some embodiments, before obtaining a classifier model by training, the model training module can be further configured to perform vectorization processing on the target behavior data in the target behavior data set.

According to some embodiments, before inputting the selected candidate user behavior data into a trained classifier model, the prediction module can be further configured to perform vectorization processing on the selected candidate user behavior data.

The data-driven methods and the apparatuses for predicting a user inquiry proposed in the present disclosure utilize users' behavior trajectory information within a short time period before the user inquiry, to perform classification prediction of user inquiries. This can improve the accuracy of classification, which is more effective than existing prediction techniques not considering such information.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods according to some embodiments of the present disclosure, the scope of which is defined by the appended claims.

According to some embodiments of the present disclosure, a classifier model can be trained based on training data. The trained classifier model can be used to predict a user inquiry regarding a problem the user has encountered based on user behavior data.

Figure 1:
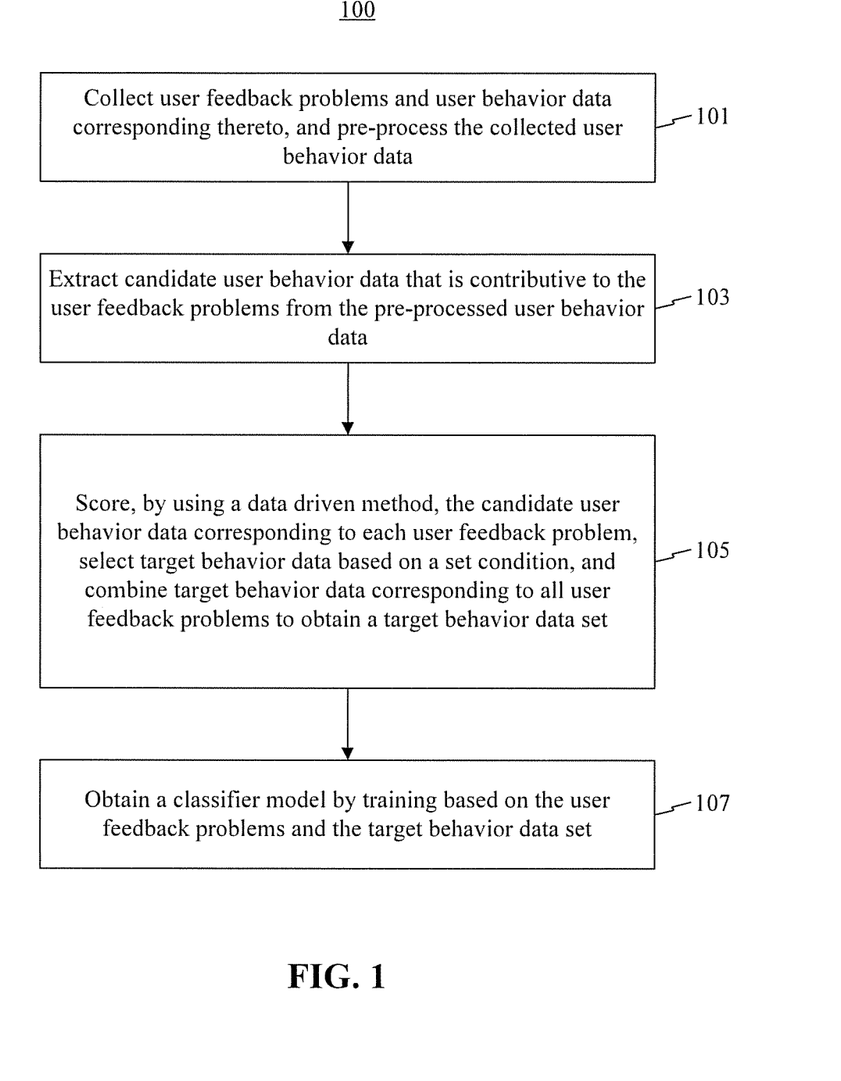
FIG. 1 is a flowchart of an exemplary method of training a classifier model according to some embodiments of the present disclosure.

As shown in FIG. 1, an exemplary method 100 of training a classifier model by using training data can include the following procedures:

In step 101, user feedback problems and user behavior data corresponding thereto can be collected. The collected user behavior data can be pre-processed. The pre-processing can include, for example, removing interference user behavior data and digitally identifying the behavior data.

A user's behavior data can be collected for each user feedback problem. A large amount of behavior data can be obtained corresponding to various user feedback problems. The user behavior data can include data associated with certain user operations, such as clicking a mobile phone or a tablet terminal, browsing the internet, and other operations performed by the user. The operations can be represented by URLs or API names, which can be preceded by a unix timestamp. For example, recent behaviors of a user X in a certain period of time can be represented as:

1438661879: alipay.mappprod.shop.queryPage
1438661885: alipay.client.mobileapp.checkResult
1438661889: alipay.commerce.category.queryByCategoryId
1438661899: alipay.siteprobe.sync.queryWifis
1438661909: alipay.charity.mobile.donate.deduct.unsign
. . . .
. . . .
1438661999:https://couriercore.alipay.com/errorRepeatSubmit.htm
1438662999:https://cshall.alipay.com/lab/question.htm In some embodiments, to be more accurate and to facilitate subsequent processing, the pre-processing can include removing interference user behavior data and digitally identifying the behavior data.

The interference user behavior data removed can include, for example, user behavior data with an extremely low frequency of occurrence, for example, lower than a set frequency threshold. For behavior data with an extremely low frequency of occurrence, there is a low possibility that such data contributed to, or led to the user inquiry. Such data can therefore be removed, so as to avoid interference caused by such data.

In some embodiments, digitally identifying the behavior data can facilitate performing processing directly with the digital identifiers in the subsequent procedures. That way, processing does not have to be based on the specific data of the behavior data, such as a URL, an API name or other long string data. The processing can be simplified.

In some embodiments, digitally identifying the behavior data can include digitally identifying URLs or APIs of the behavior data according to a preset mapping table. Alternatively, the process can include sorting and numbering the behavior data according to their respective frequencies of occurrence, and using the numbers as digital identifiers of the behavior data. In some embodiment, the process can include obtaining digital identifiers corresponding to the behavior data using a HASH calculation, based on the specific content of the behavior data. In the foregoing example, the behavior data after the digital identification process can become:

1438661879: 2
1438661885: 65
1438661889: 11
1438661899: 6
1438661909: 18
. . . .
. . . .
1438661999:108
1438662999:111

Screening and processing can be performed directly with the digital identifiers in the subsequent steps.

In step 103, candidate user behavior data that is contributive to the user feedback problems can be extracted from the pre-processed user behavior data.

Although there is a large amount of user behavior data, the user's behavior data in a recent period of time prior to the occurrence of the inquiry is often the data that actually affects or leads to the inquiry. That is, the behavior data that is contributive to a user feedback problem can be the user's behavior data in a recent period of time. The influence of historical behavior data can be omitted. For example, a user's behavior data in a recent period of time can be extracted as candidate user behavior data.

In some embodiments, the user behavior data can be extracted by windowing, and a fixed window length or a variable window length can be selected. The fixed window length approach can be, for example, selecting 30-120 pieces of behavior data, namely, 30-120 pieces of behavior data before the current behavior data. The variable window length approach can be, for example, selecting behavior data within a certain period of time before the current behavior data, such as a duration of 0.5 hours to 2 hours before the current time.

In the foregoing example, for the above behavior data, windowing truncation backtracks from the last behavior data, that is, 1438662999:111. The length can be a fixed window length (30-120 pieces of data) or a variable window length (0.5 hours to 2 hours, which can be determined by a unix timestamp). Assume that the data after windowing truncation becomes:

1438661885: 65
1438661889: 11
1438661899: 6
1438661909: 18
1438661999:108
. . . .
. . . .
1438662999:111

Therefore, candidate user behavior data that is contributive to the user feedback problems can be obtained. By traversing user behavior data corresponding to each user feedback problem, candidate user behavior data corresponding to each user feedback problem can be obtained.

In step 105, according to user feedback problems and candidate user behavior data corresponding thereto, the candidate user behavior data corresponding to each user feedback problem can be scored by using a data-driven method. Target behavior data can be selected based on a set condition. Target behavior data corresponding to all user feedback problems can be combined to obtain a target behavior data set.

In some embodiments, the user feedback problems can be considered a document collection or corpus, and each user feedback problem can be considered a document. The data-driven method can be a Term Frequency-Inverse Document Frequency (TF-IDF) method. The TF-IDF method refers to a commonly used statistical method for information retrieval and data mining. It can be used to assess the importance of a term to a document in a document collection or corpus. The importance of a term increases proportionally with the number of times it appears in the document, while being inversely proportional to the frequency that it appears in the corpus. In some embodiments, the candidate user behavior data can be equivalent to terms, all the user feedback problems can be equivalent to a corpus, and every user feedback problem can be equivalent to a document in the corpus. The candidate user behavior data corresponding to the user feedback problems can be scored using the TF-IDF scheme.

For example, according to the TF-IDF scheme, if a term appears in a document at a high frequency, while it rarely appears in other documents, it can be considered that the term has high discriminating power. That is, the term is suitable for classification purposes. TF-IDF refers to TFXIDF: TF (Term Frequency) and IDF (Inverse Document Frequency). TF indicates the frequency that a term t appears in a document d. IDF, on the other hand, reflects how often the term appears across all the different documents. If the term only appears in a smaller number of documents, then the corresponding IDF is greater. That means the term has high discriminating power. Further, if the number of documents in a category C containing term t is m, and the number of documents in other categories containing term t is k, then the total number of documents containing term t is n=m+k. If m is bigger, then n is bigger, and the calculated corresponding IDF would be smaller. That means term t does not have high discriminating power.

For example, a detailed TF-IDF calculation process m can be as follows:

In the first step, a TF is calculated:

$$\text{Term Frequesncy } (TF) = \frac{\text{the number of times a term appears in a document}}{\text{the total number of terms in the document}}$$

In the second step, an IDF is calculated:

$$\text{Inverse Document Frequency } (IDF) = \log\frac{\text{the total number of documents in a corpus}}{\text{the number of documents containing the term} + 1}$$

In the third step, TF-IDF is calculated:

$$\text{TF-IDF} = \text{TF} \times \text{IDF}$$

In a sense, user behavior data can be seen as terms, and its importance to a user inquiry can be determined similar to the way the importance of a term to a document in a corpus can be determined based on the TF-IDF scheme. User behavior data suitable for classification can be selected as target behavior data.

In some embodiments, for each user feedback problem, first N (for example, 50-200) pieces of user behavior data with the highest scores or behavior data with a score higher than a threshold can be used as target behavior data. The target behavior data corresponding to all user feedback problems can be combined to form a target behavior data set. The amount of behavior data included in the set can be much less than the amount of behavior data in all the training data.

For example, behavior data corresponding to a problem A can be (represented with digital identifiers):

6 18 1 9 77 98 69 . . . .

. . . 88 189 87

The digital identifiers can be scored by using TF-IDF and ranked. Top N (for example, N=50) digital identifiers, which are the most important to problem A, can be obtained as follows:

A: 11 18 . . . 108 . . . .

The selected digital identifiers corresponding to all the user feedback problems can be combined, to obtain a target behavior data set. Accordingly, this obtained target behavior data set includes target behavior data corresponding to all known user feedback problems.

Further, the target behavior data in the target behavior data set can be digitally identified again, so as to facilitate subsequent processing.

In step 107, a classifier model can be obtained by training based on the user feedback problems and the target behavior data set.

A classifier model can be obtained by training, using known user feedback problems and target behavior data corresponding thereto. With the classifier model, when a user initiates an inquiry, prediction can be made as to which known problem the inquiry corresponds to by analyzing the user's behavior data. That way, it is more convenient for the customer service staff to respond to the user's inquiry and provide a solution.

The classifier model can include, but is not limited to, a logistic regression model, a deep neural network model, a support vector machine model, a recursive neural network model, and so on. Various methods exist for obtaining a model by training according to training data, which are not described in detail here.

Figure 2:
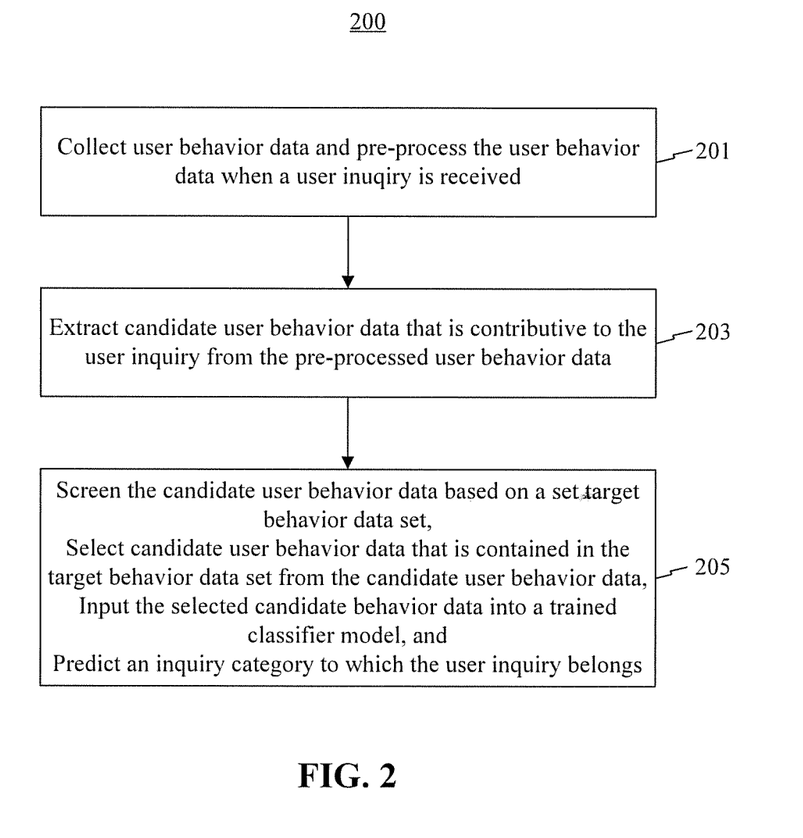
FIG. 2 is a flowchart of an exemplary data-driven method for predicting user inquiries according to some embodiments of the present disclosure.

According to some embodiments of the present disclosure, data-driven methods for predicting user inquiries are provided. As shown in FIG. 2, one exemplary method includes the following procedures:

In step 201, user behavior data can be collected and pre-processed when a user inquiry is received.

In step 203, candidate user behavior data that is contributive to the user inquiry can be extracted from the pre-processed user behavior data.

After the customer service receives the user inquiry, user behavior data can be captured and pre-processed. The specific pre-processing and the windowing and truncation process have been described above with respect to training of the classifier model, which are no longer described in detail here.

In step 205, the candidate user behavior data can be screened based on a set target behavior data set. Candidate user behavior data that is contained in the target behavior data set can be selected. The selected candidate user behavior data can be input into a trained classifier model. An inquiry category to which the user inquiry belongs can be predicted.

For example, after being screened based on a target behavior data set, behavior data of a user X becomes:

1438661889: 11

1438661909: 18

. . . .

. . . .

1438661999:108

If that the target behavior data set does not include 1438661885:65, 1438661899:6 and 1438662999:111, then these three pieces of data can be removed since they are not included in the target behavior data set.

As described above, the target behavior data set has been obtained by screening and the classifier model has been obtained by training. When a user submits a question to the customer service, the customer service can submit the user's candidate user behavior data to a trained classifier model. Through calculation, the classifier model can determine the category of the problem the user has encountered, output probabilities of the problem corresponding to different known problems, and select the problem with the highest probability as the category to which the user inquiry belongs.

In some embodiments, to facilitate training the classifier model and subsequent prediction, the data-driven method for predicting a user inquiry can further include performing vectorization processing on the target behavior data in the target behavior data set, and performing vectorization processing on the candidate user behavior data.

The vectorization processing can include binarization and quantification. The binarization process can refer to setting 1 as the value for a corresponding vector position if a behavior occurs and to setting 0 if the behavior does not occur. The quantification can indicate the number of times the behavior occurs at a corresponding vector position. After vectorization, user behavior data can be used to directly train the classifier model and to perform actual prediction. Further, it can also be combined with original data features to train the classifier model and to perform actual prediction.

Figure 3:
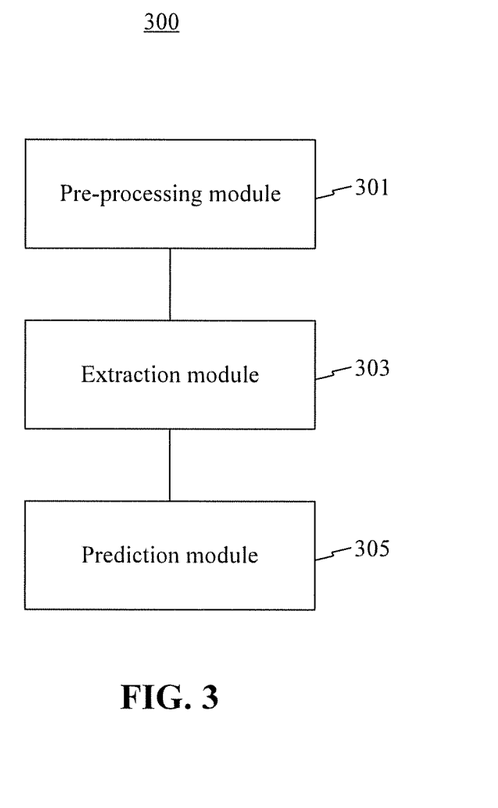
FIG. 3 is a schematic structural diagram of an exemplary data-driven apparatus for predicting user inquiries according to some embodiments of the present disclosure.

According to some embodiments of the present disclosure, data-driven apparatuses for predicting user inquiries are provided. As shown in FIG. 3, one exemplary apparatus includes a pre-processing module 301, an extraction module 303, and a prediction module 305.

Pre-processing module 301 can be configured to collect user behavior data and pre-process the user behavior data when a user inquiry is received.

Extraction module 303 can be configured to extract candidate user behavior data that is contributive to the user inquiry from the pre-processed user behavior data.

Prediction module 305 can be configured to screen the candidate user behavior data based on a set target behavior data set, select candidate user behavior data that is contained in the target behavior data set from the candidate user behavior data, input the selected candidate user behavior data into a trained classifier model, and predict an inquiry category to which the user inquiry belongs.

In some embodiments, the apparatus for predicting a user inquiry can further include a model training module configured to train a classifier model, and when training the classifier model, the model training module performs the following operations: collecting user feedback problems and behavior data corresponding thereto, and pre-processing the collected user behavior data; extracting behavior data that is contributive to the user feedback problems from the pre-processed user behavior data as candidate user behavior data; scoring, using a data-driven method according to user feedback problems and the candidate user behavior data corresponding thereto, the candidate user behavior data, selecting target behavior data based on a set condition, and combining target behavior data corresponding to user feedback problems to obtain a target behavior data set; and obtaining a classifier model by training according to the user feedback problems and the target behavior data set.

In some embodiments, when pre-processing the collected user behavior data, the pre-processing module 301 can be further configured to perform removing interference user behavior data whose frequency is lower than a set frequency threshold.

In some embodiments, the pre-processing module can be further configured to digitally identify the user behavior data.

In some embodiments, the extraction module 303 adopts a method of windowing and truncation when extracting candidate user behavior data that is contributive to the user inquiry from the pre-processed user behavior data. The windowing and truncation process can include extracting user behavior data in a recent period of time prior to the occurrence of the user inquiry.

Similar to the processing as described with respect to the exemplary method embodiments, after combining target behavior data corresponding to the user feedback problems to obtain a target behavior data set, the model training module can be further configured to digitally identify the target behavior data in the target behavior data set again.

In some embodiments, before obtaining a classifier model by training, the model training module can be further configured to perform vectorization processing on the target behavior data in the target behavior data set.

Similar to the processing as described with respect to the exemplary method embodiments, before inputting the selected candidate user behavior data into a trained classifier model, the prediction module 305 can be further configured to perform vectorization processing on the selected candidate user behavior data.

It is appreciated that the embodiments of the present disclosure can be implemented as a method, an apparatus, or a computer program product. For example, one or more modules as described with reference to FIG. 3 may be implemented as a hardware embodiment, a software embodiment, or an embodiment combining software and hardware. Further, certain modules or processes of the present disclosure may be provided in the form of a computer program product implemented on one or more computer usable storage media (including, but not limited to, a magnetic disk memory, a CD-ROM, an optical memory, and the like) including computer-readable program codes therein. The storage media can include a set of instructions for instructing a computer device (which may be a personal computer, a server, a network device, a mobile device, or the like) or a processor to perform a part of the steps of the methods described in the embodiments of the present disclosure.

The foregoing storage medium may include, for example, any medium that can store a program code, such as a USB flash disk, a removable hard disk, a Read-Only Memory (ROM), a Random Access Memory (RAM), a magnetic disk, or an optical disc. The storage medium can be a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

The above described exemplary embodiments are only used to describe the technical solutions provided by the present disclosure. They do not limit the scope of the present disclosure. Those skilled in the art can make various changes and modification without departing from the spirit and the essence of the present disclosure. Such changes and modifications should all belong to the protection scope of the present disclosure, as defined by the appended claims.

The invention claimed is:

1. A method comprising:
   collecting, by a device having one or more processors, user behavior data and pre-processing the user behavior data when a user inquiry is received;
   extracting user behavior data associated with the user inquiry from the pre-processed user behavior data as candidate user behavior data;
   selecting, from the candidate user behavior data, candidate user behavior data that is contained in a target behavior data set;
   performing vectorization on the selected candidate user behavior data;
   inputting, by the device, the vectorized selected candidate user behavior data into a classifier model that is a neural network model trained based on training data; and
   predicting an inquiry category associated with the user inquiry using the classifier model based on the inputted selected candidate user behavior data.

2. The method of claim 1, wherein extracting user behavior data associated with the user inquiry from the pre-processed user behavior data as candidate user behavior data uses a windowing and truncation process comprising:
   extracting user behavior data in a period of time prior to the user inquiry.

3. The method of claim 1, further comprising training the classifier model.

4. The method of claim 1, wherein the classifier model is trained by:
   collecting a plurality of user inquiries and user behavior data corresponding thereto;

pre-processing the collected user behavior data;
extracting user behavior data associated with each of the plurality of user inquiries from the pre-processed user behavior data as candidate user behavior data;
scoring, by using a data-driven method, the candidate user behavior data corresponding to each of the plurality of user inquiries;
selecting, from the scored candidate user behavior data, target behavior data based on a set condition; and
obtaining a classifier model by training, based on the plurality of user inquiries and the target behavior data.

5. The method of claim 4, wherein pre-processing the collected user behavior data comprises:
removing user behavior data having a frequency of occurrence lower than a set threshold.

6. The method of claim 4, wherein pre-processing the collected user behavior data comprises:
digitally identifying the collected user behavior data.

7. The method of claim 4, further comprising:
digitally identifying the target behavior data.

8. The method of claim 4, wherein before obtaining a classifier model by training, the method further comprises:
performing vectorization on the target behavior data.

9. An apparatus, comprising:
a memory storing a set of instructions; and
a processor configured to execute the set of instructions to cause the apparatus to perform:
collecting user behavior data and pre-processing the user behavior data when a user inquiry is received;
extracting user behavior data associated with the user inquiry from the pre- processed user behavior data as candidate user behavior data;
selecting, from the candidate user behavior data, candidate user behavior data that is contained in a target behavior data set;
performing vectorization on the selected candidate user behavior data;
inputting the vectorized selected candidate user behavior data into a classifier model that is a neural network model trained based on training data; and
predicting an inquiry category associated with the user inquiry using the classifier model based on the inputted selected candidate user behavior data.

10. The apparatus of claim 9, wherein extracting user behavior data associated with the user inquiry from the pre-processed user behavior data as candidate user behavior data uses a windowing and truncation process comprising:
extracting user behavior data in a period of time prior to the user inquiry.

11. The apparatus of claim 9, wherein the classifier model is trained by:
collecting a plurality of user inquiries and user behavior data corresponding thereto;
pre-processing the collected user behavior data;
extracting user behavior data associated with each of the plurality of user inquiries from the pre-processed user behavior data as candidate user behavior data;
scoring, by using a data-driven method, the candidate user behavior data corresponding to each of the plurality of user inquiries;
selecting, from the scored candidate user behavior data, target behavior data based on a set condition; and
obtaining a classifier model by training, based on the plurality of user inquiries and the target behavior data.

12. The apparatus of claim 11, wherein pre-processing the collected user behavior data comprises:
removing user behavior data having a frequency of occurrence lower than a set threshold.

13. A non-transitory computer readable medium that stores a set of instructions that is executable by at least one processor of a computer to cause the computer to perform a method, the method comprising:
extracting user behavior data associated with the user inquiry from the pre-processed user behavior data as candidate user behavior data;
selecting, from the candidate user behavior data, candidate user behavior data that is contained in a target behavior data set;
performing vectorization on the selected candidate user behavior data;
inputting the vectorized selected candidate user behavior data into a classifier model that is a neural network model trained based on training data; and
predicting an inquiry category associated with the user inquiry using the classifier model based on the inputted selected candidate user behavior data.

14. The non-transitory computer readable medium of claim 13, wherein extracting user behavior data associated with the user inquiry from the pre-processed user behavior data as candidate user behavior data uses a windowing and truncation process comprising:
extracting user behavior data in a period of time prior to the user inquiry.

15. The non-transitory computer readable medium of claim 13, wherein the classifier model is trained by:
collecting a plurality of user inquiries and user behavior data corresponding thereto;
pre-processing the collected user behavior data;
extracting user behavior data associated with each of the plurality of user inquiries from the pre-processed user behavior data as candidate user behavior data;
scoring, by using a data-driven method, the candidate user behavior data corresponding to each of the plurality of user inquiries;
selecting, from the scored candidate user behavior data, target behavior data based on a set condition; and
obtaining a classifier model by training, based on the plurality of user inquiries and the target behavior data.

16. The non-transitory computer readable medium of claim 15, wherein pre-processing the collected user behavior data comprises:
removing user behavior data having a frequency of occurrence lower than a set threshold.

17. The non-transitory computer readable medium of claim 15, wherein pre-processing the collected user behavior data comprises:
digitally identifying the collected user behavior data.

* * * * *